United States Patent
Krönke et al.

(10) Patent No.: US 7,521,117 B2
(45) Date of Patent: Apr. 21, 2009

(54) RESIN COMPOSITION COMPRISING WASTE OF RESIN IMPREGNATED MATERIAL

(75) Inventors: Thomas Gerhard Willi Krönke, Velbert (DE); Monika Barbara Bischoff, Duisburg (DE); Alexandra Bruns, Bochum (DE); Michael Guth, Duisburg (DE); Thomas Thews, Lüdenscheid (DE); Detlef Andreas Wentzel, Essen (DE); Klaus-Dieter Hammer, Langenfeld (DE)

(73) Assignee: Coveright Surfaces Holding GmbH (DE)

( * ) Notice: Subject to any disclaimer, the term of this patent is extended or adjusted under 35 U.S.C. 154(b) by 0 days.

(21) Appl. No.: 11/134,457

(22) Filed: May 23, 2005

(65) Prior Publication Data

US 2006/0257644 A1    Nov. 16, 2006

(30) Foreign Application Priority Data

May 13, 2005  (EP) ................................ 05010471

(51) Int. Cl.
  *B32B 5/66* (2006.01)
(52) U.S. Cl. ................... 428/402; 428/403; 428/407; 428/327; 428/522; 264/122; 264/126
(58) Field of Classification Search ................ 428/402, 428/403, 407, 522, 327; 264/102, 122, 126
See application file for complete search history.

(56) References Cited

U.S. PATENT DOCUMENTS 5,215,695 A * 6/1993 Bortoluzzi et al. .......... 264/102

FOREIGN PATENT DOCUMENTS

| DE | 41 24 355 A1 |   | 1/1993 |
|----|----|----|----|
| DE | 4124355 | * | 1/1993 |
| DE | 4211446 | * | 1/1993 |
| DE | 4211446 A1 |   | 1/1993 |
| EP | 0395128 | * | 3/1990 |
| EP | 0395128 A1 |   | 10/1990 |
| EP | 0566830 A1 |   | 10/1993 |
| JP | 58145732 | * | 8/1983 |
| JP | XP-002336722 | * | 9/2000 |
| JP | 2000343666 | * | 12/2000 |

OTHER PUBLICATIONS

European Search Report for EP 0501047, published on Mar. 8, 2005.
English abstract for JP 58145732, published on Aug. 30, 1983.
English abstract for JP 2000343666, published on Dec. 12, 2000343666, published on Dec. 12, 2000.
English abstract for DE 4211446 A1, published on Jan. 7, 1993.
English abstract for EP 0566830 A1, published on Oct. 27, 1993.
English abstract for KR 2002019815, published on Mar. 13, 2002.
esp@cenet abstract for DE 41 24 355 published Jan. 28, 1993.

* cited by examiner

*Primary Examiner*—Leszek Kiliman
(74) *Attorney, Agent, or Firm*—Finnegan, Henderson, Farabow, Garrett & Dunner, LLP

(57) ABSTRACT

Resin composition comprising ground waste of resin impregnated materials.

19 Claims, No Drawings

RESIN COMPOSITION COMPRISING WASTE OF RESIN IMPREGNATED MATERIAL

This application claims the benefit of priority to European Patent Application No. 05 010 471.0 filed on May 13, 2005.

The invention pertains to a resin composition, materials impregnated therewith and a method of manufacturing the same. It also pertains to a layered materials such as laminates or technical films (phenol resin film) comprising these materials. Such laminates are commonly used in the production of working surfaces, furniture components, panels or flooring. Technical films are frequently used for casings in concrete construction.

In the manufacturing process of resin impregnated materials waste in terms of cuttings or clippings accumulates for example when rolls or stocks of the impregnated material are tailored to the desired sizes. Furthermore, in particular, when starting up a continuous impregnating process frequently the first meters of the production have to be discarded before the impregnated material reaches homogenous desired properties. With continuous impregnating processes exhibiting a speed of 40 to 50 m/min the quantity of discarded impregnated material easily amounts to 100 m/per start up. Thus, huge masses of waste accumulate taking into account that approximately 10 start ups per day and machine might be necessary.

The costs for disposing this waste currently arise to 200 €per ton. Furthermore, the waste of impregnated material still represents valuable resources that are not utilised. Thus in the past attempts for recycling waste of resin impregnated materials, have been developed.

From DE 4124355 A1 a recycling process for waste of resin impregnated material is known according to which the waste is first chipped to small pieces of about 1 to 5 mm and then mixed with fibre materials such as wooden chips, textiles or the like. The resulting mass is used for the production of molds, boards or profiles.

This process is applicable for the waste of thermoplast as well as duroplast based impregnated materials. However if a duroplast impregnated material is to be used, it is limited to non-fully cured resins. Furthermore, it is disadvantageous that the process according to DE 41 24 355 results in fabrics of lower added value compared to the original products.

It is therefore the object of the invention to provide a method for recycling the waste of resin impregnated materials, in particular of duroplast impregnated materials, which effectively exploits the waste and results in a product with a higher added value. In this context higher added value means a value essentially on the same level as the original products.

This object is solved by providing a layered material comprising a base material, which is impregnated with a resin composition, wherein said resin composition comprises ground waste originating from resin impregnated materials. Furthermore a process is provided for producing the same. Last but not least the resin composition as such comprising the ground waste is provided.

Surprisingly it was found, that adding ground waste material to the resin composition does not deteriorate the physical and aesthetic properties of the resulting impregnated material compared to impregnated materials solely containing primary basic materials and no ground waste (non-waste resin).

The physical and aesthetic properties of a laminate comprising the impregnated materials according to the invention were assessed according to DIN EN 14 323:2004, which is generally applied to test melamine faced boards for interior uses. In particular these test methods were used to assess the surface structure (DIN EN 14 323:2004, 5.4), the susceptibility for tears/cracks (DIN EN 14 323:2004, 5.7) and the compliance (consistency) with the non-treated materials (i.e. the material impregnated with non-waste resin) in terms of colour and optical surface appearance (DIN EN 14 323:2004, 5.8).

Thus it is a particular advantage of the invention that the waste material can be re-integrated into the original production process without limiting the use of the resulting product. Furthermore it is advantageous that the process according to the invention simply requires an easy grinding or milling step of the waste material without further chemical or physical manipulation of the waste. This keeps the process according to the invention time and cost efficient.

It is an especially important advantage of the process according to the invention that both, non fully cured as well as fully cured duroplasts can be applied as ground waste. Otherwise a huge amount of waste was excluded from this recycling process.

It is a further advantage of the invention that, due to the addition of the ground waste to the resin composition, the mass per unit area (grammage) of the base material—in particular the paper—used in the manufacturing process of a layered material can be decreased. Thus the invention does not only avoid high costs for disposal of the waste but also leads to a reduction of the costs for primary basic materials. If for example paper is used as the base material the mass weight per unit area can be reduced from 80 $g/m^2$ to 70 $g/m^2$ or even less without a negative impact on the stability or appearance of the final product. Thus, the desired properties of an impregnated paper can be obtained with lower production costs.

In an advantageous embodiment of the invention ground waste with a particle size of 100 μm or less preferably 25-45 μm, is added to the resin. When particles of this size are used, the final product has particularly satisfying surface and colour properties, as indicated by tests according to the above mentioned DIN EN norm.

The resin according to the invention favourably contains 30% per weight or less ground waste, preferably less than 22%. Then the size of the ground waste is preferably 100 μm or less. This resin leads to a satisfying surface formation and impregnation due to the good dilution of the particles in the resin.

As outlined above in one particular embodiment, the resin comprises ground waste originating from a duroplast. The use of duroplasts in the resin leads to a hard and durable surface of the final product. Preferably, the duroplast waste is not fully cured, which results in the formation of molecular bonds during the curing process between the waste resin and the non-waste resin and thus in a good cohesion of the ground waste resin and the non-waste resin in the final product. However, the waste material can also originate from fully condensated duroplast material.

The degree of condensation in the ground waste is favourably about 70% or less, more preferably 20-40%. Typically the degree of condensation is measured by the determination of extractable compounds using dimethylformamide. With such degrees of condensation, the rest reactivity of the waste duroplast, i.e. the reactivity to form molecular bounds with the non-waste resin, is very satisfying.

According to one embodiment of the invention the base material may be impregnated at first with a non-waste resin and then afterwards in a second step with a resin containing ground waste. In this first impregnation step the non-waste resin can "fill" the base material, which is advantageous if this first resin is cheaper than the waste containing resin. The non-waste resin is preferably a urea resin.

After the first impregnation step, the material can be dried before the second impregnating step is performed. This permits the storage of the impregnated material prior to the second impregnating step. In cases when the drying step employs sufficient temperatures, the non-waste resin may be partly cured and thus rendering the impregnated base material an optimal base for the application of the waste containing resin.

The base material may be for example a paper. In a particularly preferred embodiment, the base material is a paper with a weight of 40-120 $g/m^2$, preferably 60-80 $g/m^2$. These paper weights are advantageous, because when impregnated with a resin according to the invention they result in impregnated papers of approximately 140-190 $g/m^2$, which are the regular weights of impregnated papers often used in laminating processes.

When manufacturing a layered material with the resin according to the invention both sides of the base material can be impregnated. However, in certain applications it may be useful to impregnate only one side. Thus, the side impregnated with the waste material comprising resin may face upwards or downwards in the determined application, depending on whether the appearance of this side is favourable or not.

In an advantageous embodiment, an impregnated material comprising a paper base material, such as a decor sheet, is attached to a carrying layer in order to form a laminate. This allows the formation of laminates comprising a low weight paper impregnated with a waste material comprising resin while at the same time avoiding high recycling costs.

When using the resin according to the invention to impregnate a base material (e.g. a decorative paper) which is further on used for the manufacture of a laminate it is advantageous to attach the impregnated paper with its impregnated side towards the carrying layer of the laminate (e.g. the MDF board). Thus, the non-impregnated side of the impregnated paper—or its side impregnated with a non-waste resin—is the outer layer of the laminate. The laminate can comprise all types of carrying layers, for example a high density fibreboard (HDF), a medium density fibreboard (MDF), a chipboard, a gypsum board or a glass fibreboard.

The resin according to the invention preferably is applied for manufacturing of laminates or technical films.

EXAMPLES

Reference

A chipboard with a thickness of 16 mm, (size 25×25 $cm^2$) is on both sides coated with a white decor film (melamine resin impregnated decor sheet, final weight 185 $g/m^2$, paper weight 80 $g/m^2$, content of volatile components 6.5%). For the lamination process, a short cycle press applying a temperature of 160° C., a pressure of 20 $kg/cm^2$ and a pressing time of 30 s is used.

The resulting coating is analysed using DIN EN 14 323 "Melamine faced boards for interior uses—Characteristics and test methods", German version EN 14 323:2004. The test methods 5.4 Surface defects, 5.7 Tear susceptibility and 5.8 Colour and surface consistency were applied.

Accordingly, the following test results are obtained:

| Testing method: | 5.4 | surface defects: none |
|---|---|---|
| | 5.7 | susceptibility to tears/cracks: rank 5: no tears/cracks |
| | 5.8 | colour and surface consistency form the necessary base for comparison with the following examples |

Example 1

Waste containing impregnated materials, in particular cuttings (waste) accumulating in the manufacture of white decor papers are ground to a size 100 μm or less by using an appropriate milling facility. Using a white decor paper with a weight of 80 $g/m^2$ and a mixture consisting of 66.7% melamine resin (impregnating resin with a solid content of 60%), 19.0% soft water and 14.3% ground cuttings, a white decor film with a weight of 185 $g/m^2$ and a content of volatile components of 6.6% is prepared using standard impregnating procedures.

A chipboard with a thickness of 16 mm and a size of 25×25 $cm^2$ is laminated in a short cycle press applying a temperature of 160° C., a pressure of 20 $kg/cm^2$ and a pressing time of 30 s. According to DIN EN 14 323, the following test results are obtained:

| testing method: | 5.4 | Surface defects: none |
|---|---|---|
| | 5.7 | susceptibility to tear/crack: rank 5: no tears/cracks |
| | 5.8 | consistency in colour and surface: (as compared to the surface of a laminate without waste material) |
| | 5.8.5.2 | consistency in colour: rank 3: moderate deviations: darker white |
| | 5.8.5.3 | consistency in surface: rank 2: significant deviations: in terms of the white colour the surface appears significantly more uniform and more intensive |

Example 2

As outlined in example 1, an impregnated decor paper with a of 180 $g/m^2$ and a content of volatile components of 6.4% is prepared using a white decor paper with a paper weight (grammage) of 70 $g/m^2$ and laminated to a 16 mm thick chipboard (size 25×25 $cm^2$) applying the same pressure conditions. According to DIN EN 14 323, the following test results are obtained:

| testing method: | 5.4 | Surface defects: none |
|---|---|---|
| | 5.7 | susceptibility to tear/crack: rank 5: no tears/cracks |
| | 5.8 | consistency in colour and surface: (as compared to the surface of a laminate without waste material) |
| | 5.8.5.2 | consistency in colour: rank 5: no visible deviations |
| | 5.8.5.3 | consistency in surface: rank 5: no visible deviations |

Example 3

Ground cuttings of a white decor paper are prepared with a particle size of 100 μm or less and are then dried for 48 h at 60° C. in a drying oven to eliminate the residual reactivity.

According to examples 1 and 2 a white decor sheet with a paper weight of 70 $g/m^2$ is impregnated with a well-stirred resin composition comprising 66.7% melamine resin, 19.0% soft water and 14.3% of the above mentioned ground cuttings using standard impregnating procedures therewith providing an impregnated white decor paper.

The decor paper with a final weight of 182 $g/m^2$ and a content of volatile components of 6.9% is laminated to a 16 mm thick chipboard (size 25×25 cm²) using a short cycle press at a temperature of 160° C., a pressure of 20 kg/cm² and a pressing time of 30 s. According to DIN EN 14 323, the following test results are obtained:

| testing method: | 5.4 | Surface defects: none |
|---|---|---|
| | 5.7 | susceptibility to tear/crack: rank 5: no tears/crack |
| | 5.8 | consistency in colour and surface: (as compared to the surface of a laminate without waste material) |
| | 5.8.5.2 | consistency in colour: rank 5: no visible defects |
| | 5.8.5.3 | consistency in surface: rank 5: no visible defects |

Example 4

A decor paper printed with a wood imitation and a paper weight of 75 g/m² impregnated on its decorative side with a melamine resin. The non-decorative side is impregnated with the resin according to the invention comprising 55.9% melamine resin, 24.0% soft water and 20.1% ground waste cuttings. The impregnated paper is dried afterwards. The waste cuttings originate from various decor film products, i.e. from the manufacture of impregnated white decor papers and various printed decor films.

The resulting printed decor paper has a final weight of 178 g/m² and a content of volatile components of 6.7%. It is laminated to a 16 mm thick chipboard (size 25×25 cm²) on both sides using a short cycle press with a temperature of 165° C., a pressure of 22 kg/cm² and a pressing time of 25 s. According to DIN EN 14 323, the following test results are obtained:

| testing method: | 5.4 | Surface defects: none |
|---|---|---|
| | 5.7 | susceptibility to tears/cracks: rank 5: no tears/cracks |
| | 5.8 | consistency in colour and surface: (as compared to the surface of a laminate without waste material) |
| | 5.8.5.2 | consistency in colour: rank 5: no visible defects |
| | 5.8.5.3 | consistency in surface: rank 5: no visible defects |

Example 5

In analogy to example 4, a dark green decor paper with a paper weight of 85 g/m² is impregnated: The non-decor side is impregnated with a composition according to the invention comprising 61.5% of a melamine resin, 21.5% soft water and 17% ground cuttings originating from various mixed impregnated decor papers.

The resulting final impregnated decor paper has a weight of 195 g/m² and a content of volatile components of 6.8%. It is laminated to a 16 mm thick chipboard (size 25×25 cm²) on both sides using a short cycle press with a temperature of 160° C., a pressure of 25 kg/cm² and a pressing time of 30 s. According to DIN EN14323, the following test results are obtained:

| testing method: | 5.4 | Surface defects: none |
|---|---|---|
| | 5.7 | susceptibility to tears/cracks: rank 5: no tears/cracks |
| | 5.8 | consistency in colour and surface: (as compared to the surface of a laminate without waste material) |
| | 5.8.5.2 | consistency in colour: rank 5: no visible defects |
| | 5.8.5.3 | consistency in surface: rank 5: no visible defects |

Example 6

An ecru natron kraft paper with a paper weight of 40 g/m² is impregnated with a well-stirred composition according to the invention comprising 66.7% phenol resin (solid content 65%), 19% soft water and 14.3% ground waste cuttings. The cuttings have a particle size of 100 μm or less and were compiled in the production of various phenol resin films (technical films). The resulting phenol resin film has a weight of 122 g/m² and a content of volatile components of 7.1%.

The film is laminated to both sides of a beech plywood plate (size 25×25 cm²) using a short cycle press with a pressure of 15 kg/cm², a pressing temperature of 130° C. and a pressing time of 8 minutes. The test results correspond to the results obtained with surface coverings without the use of waste cuttings.

The invention claimed is:

1. A resin composition comprising waste of a resin impregnated material;
   wherein the resin composition further comprises a duroplast, in addition to any optional duroplast already present in the waste;
   wherein the waste is ground and not subject to further chemical or physical manipulation; and
   wherein the resin composition comprises 30% (by weight) or less ground waste.

2. The resin composition according to claim 1, wherein the ground waste has a particle size of 100 μm or less.

3. The resin composition according to claim 1, wherein said ground waste originates from a material impregnated with a duroplast.

4. The resin composition according to claim 3, wherein said duroplast is not fully cured.

5. The resin composition according to claim 4, wherein the duroplast exhibits a degree of condensation of 70% or less.

6. The resin composition according to claim 1 comprising a melamine resin.

7. A layered material comprising a base material having at least one side impregnated with a resin composition,
   wherein the resin composition comprises waste of a resin impregnated material;
   wherein the resin composition further comprises a duroplast, in addition to any optional duroplast already present in the waste;
   wherein the waste is ground and not subject to further chemical or physical manipulation; and
   wherein the resin composition comprises 30% (by weight) or less ground waste.

8. The layered material according to claim 7, wherein said at least one side of the base material was first impregnated with a non-waste resin prior to being impregnated with the resin composition comprising ground waste.

9. The layered material according to claim 8, wherein said at least one side of the base material is dried after being impregnated with the non-waste resin.

10. The layered material according to claim 7, wherein the base material is a paper with a paper weight of 40-120 g/m$^2$.

11. A laminate comprising a layered material according to claim 7 and a carrying layer, wherein said at least one side of the layered material impregnated with the resin composition comprising ground waste faces towards said carrying layer.

12. A method of producing an impregnated layered material comprising a base material and a resin, comprising impregnating at least one side of the base material with a resin composition,
   wherein the resin composition comprises waste of a resin impregnated material;
   wherein the resin composition further comprises a duroplast, in addition to any optional duroplast already present in the waste;
   wherein the waste is ground and not subject to further chemical or physical manipulation; and
   wherein the resin composition comprises 30% (by weight) or less ground waste.

13. The method according to claim 12, wherein said at least one side of the layered material is impregnated in a first step with a resin composition not having ground waste of a resin impregnated material prior to being impregnated with the resin composition comprising ground waste.

14. A method of producing a laminate comprising attaching a layered material to a carrying layer;
   wherein the layered material comprises a base material having at least one side impregnated with a resin composition;
   wherein the resin composition comprises waste of a resin impregnated material;
   wherein the resin composition further comprises a duroplast, in addition to any optional duroplast already present in the waste;
   wherein the waste is ground and not subject to further chemical or physical manipulation;
   wherein the resin composition comprises 30% (by weight) or less ground waste; and
   wherein said at least one side of the layered material impregnated with the resin composition comprising ground waste faces towards the carrying layer.

15. The resin composition according to claim 2, wherein the ground waste has a particle size from 25 μm to 45 μm.

16. The resin composition according to claim 1, comprising 21% (per weight) or less ground waste.

17. The resin composition according to claim 3, wherein said ground waste originates from a material impregnated with an aminoplast or a phenoplast.

18. The resin composition according to claim 5, wherein the duroplast exhibits a degree of condensation from 20 to 40%.

19. The layered material according to claim 10, wherein the base material is a paper with a paper weight from 60 to 80 g/m$^2$.

* * * * *